US009720894B1

United States Patent
Pasko et al.

(10) Patent No.: US 9,720,894 B1
(45) Date of Patent: Aug. 1, 2017

(54) METHODS AND SYSTEMS FOR ANNOTATING AN IMAGE AND PUBLISHING THE ANNOTATED IMAGE

(75) Inventors: Stanislaw Pasko, Warsaw (PL); Michal Brzozowski, Cracow (PL); Wiktor Gworek, Cracow (PL); Zachary Yeskel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 526 days.

(21) Appl. No.: 13/617,618

(22) Filed: Sep. 14, 2012

(51) Int. Cl.
 *G06F 17/24* (2006.01)
 *G06F 17/30* (2006.01)

(52) U.S. Cl.
 CPC .......... *G06F 17/241* (2013.01); *G06F 17/24* (2013.01); *G06F 17/30058* (2013.01)

(58) Field of Classification Search
 CPC ... G06F 17/241; G06F 17/30058; G06F 17/24
 USPC ........................................ 715/233
 See application file for complete search history.

(56) References Cited

U.S. PATENT DOCUMENTS

| 2002/0012134 | A1* | 1/2002 | Calaway | H04N 1/00132 |
| --- | --- | --- | --- | --- |
| | | | | 358/1.18 |
| 2004/0239699 | A1* | 12/2004 | Uyttendaele et al. | 345/716 |
| 2007/0067830 | A1* | 3/2007 | Kuo et al. | 726/5 |
| 2007/0294622 | A1* | 12/2007 | Sterner | G06Q 30/00 |
| | | | | 715/716 |
| 2008/0163317 | A1* | 7/2008 | Mills | 725/109 |
| 2008/0285892 | A1* | 11/2008 | Sposato et al. | 382/311 |
| 2009/0222743 | A1 | 9/2009 | Hadfield | |
| 2011/0032424 | A1* | 2/2011 | Vanduyn | H04N 5/4403 |
| | | | | 348/553 |
| 2012/0102021 | A1 | 4/2012 | Hill et al. | |
| 2012/0110432 | A1* | 5/2012 | Mei et al. | 715/233 |
| 2012/0150957 | A1* | 6/2012 | Bonchi | 709/204 |
| 2012/0163770 | A1* | 6/2012 | Kaiser | H04N 21/44016 |
| | | | | 386/241 |
| 2012/0316998 | A1* | 12/2012 | Castineiras | G06Q 50/01 |
| | | | | 705/27.1 |
| 2013/0322853 | A1* | 12/2013 | Oddou | G11B 27/105 |
| | | | | 386/241 |
| 2014/0075335 | A1* | 3/2014 | Hicks et al. | 715/753 |

OTHER PUBLICATIONS

Goldman et al., "Video Object Annotation, Navigation, and Composition", Oct. 19-22, 2008, ACM, pp. 10.*

(Continued)

*Primary Examiner* — Chau Nguyen
(74) *Attorney, Agent, or Firm* — Byrne Poh LLP

(57) ABSTRACT

A computer-implemented method, computer program product, and computing system for rendering an annotatable image within an image viewer. An indication of an intent to annotate the annotatable image is received from a user. A meme generation interface is rendered with respect to the annotatable image. Meme annotation criteria is received from the user via the meme generation interface. The meme annotation criteria includes one or more of: a meme message, a meme position indicator, and a font type identifier. The annotatable image is modified based, at least in part, upon the meme annotation criteria, thus generating an annotated image. The annotated image is published to a meme publication website.

13 Claims, 4 Drawing Sheets

(56) References Cited

OTHER PUBLICATIONS

Pinar Duygulu and Howard D. Wactlar, "Associating video frames with text", Jul. 28-Aug. 1, 2003, 26th Annual International ACM SIGIR Conference, Toronto, Canada, pp. 7.*
Goldman et al., "Video Object Annotation, Navigation, and Composition", Oct. 19-22, 2008, Monterey, CA, USA, Copyright 2008 ACM, pp. 10.*
https://play.google.com/store/apps/details?id=com.zombodroid. MemeGenerator, "Meme Generator", ZomboDroid, pp. 1-2, downloaded on May 25, 2012.
http://zipmeme.com/generator, "Zipmeme", Zipmeme.com, pp. 1-3, downloaded on May 25, 2012.
http://www.quickmeme.com/make, "Quickmeme", Quickmeme. com, pp. 1-4, downloaded on May 25, 2012.

\* cited by examiner

METHODS AND SYSTEMS FOR ANNOTATING AN IMAGE AND PUBLISHING THE ANNOTATED IMAGE

TECHNICAL FIELD

This disclosure relates to annotating images and, more particularly, to the annotation of images to include memes.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites, social networks, and topical blogs.

Through the use of such social networks, users may exchange content such as photographs and videos. Further, users may annotate such photographs and videos to include commentary in the form of memes.

SUMMARY OF DISCLOSURE

In a first implementation, a computer-implemented method includes rendering an annotatable image within an image viewer. An indication of an intent to annotate the annotatable image is received from a user. A meme generation interface is rendered with respect to the annotatable image. Meme annotation criteria is received from the user via the meme generation interface. The meme annotation criteria includes one or more of: a meme message, a meme position indicator, and a font type identifier. The annotatable image is modified based, at least in part, upon the meme annotation criteria, thus generating an annotated image. The annotated image is published to a meme publication website.

In another implementation, a computer-implemented method includes rendering an annotatable image within an image viewer. An indication of an intent to annotate the annotatable image is received from a user. A meme generation interface is rendered with respect to the annotatable image. Meme annotation criteria is received from the user via the meme generation interface. The annotatable image is modified based, at least in part, upon the meme annotation criteria, thus generating an annotated image.

One or more of the following features may be included. The annotatable image may be a portion of a video. The video may be a flash video stream. The annotatable image may be a still image. The image viewer may be a still image viewer application. The image viewer may be a video viewer application. The meme annotation criteria may include one or more of: a meme message, a meme position indicator, and a font type identifier. The meme generation interface may be configured to allow the user to identify a social network for publishing the annotated image. The annotated image may be published to the identified social network. The annotated image may be published to a meme publication website. Modifying the annotatable image may include modifying the annotatable image at a later time/date.

In another implementation, a computing system includes a processor and memory configured to perform operations including rendering an annotatable image within an image viewer. An indication of an intent to annotate the annotatable image is received from a user. A meme generation interface is rendered with respect to the annotatable image. Meme annotation criteria is received from the user via the meme generation interface. The annotatable image is modified based, at least in part, upon the meme annotation criteria, thus generating an annotated image.

One or more of the following features may be included. The annotatable image may be a portion of a video. The video may be a flash video stream. The annotatable image may be a still image. The image viewer may be a still image viewer application. The image viewer may be a video viewer application. The meme annotation criteria may include one or more of: a meme message, a meme position indicator, and a font type identifier. The meme generation interface may be configured to allow the user to identify a social network for publishing the annotated image. The annotated image may be published to the identified social network. The annotated image maybe published to a meme publication website. Modifying the annotatable image may include modifying the annotatable image at a later time/date.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
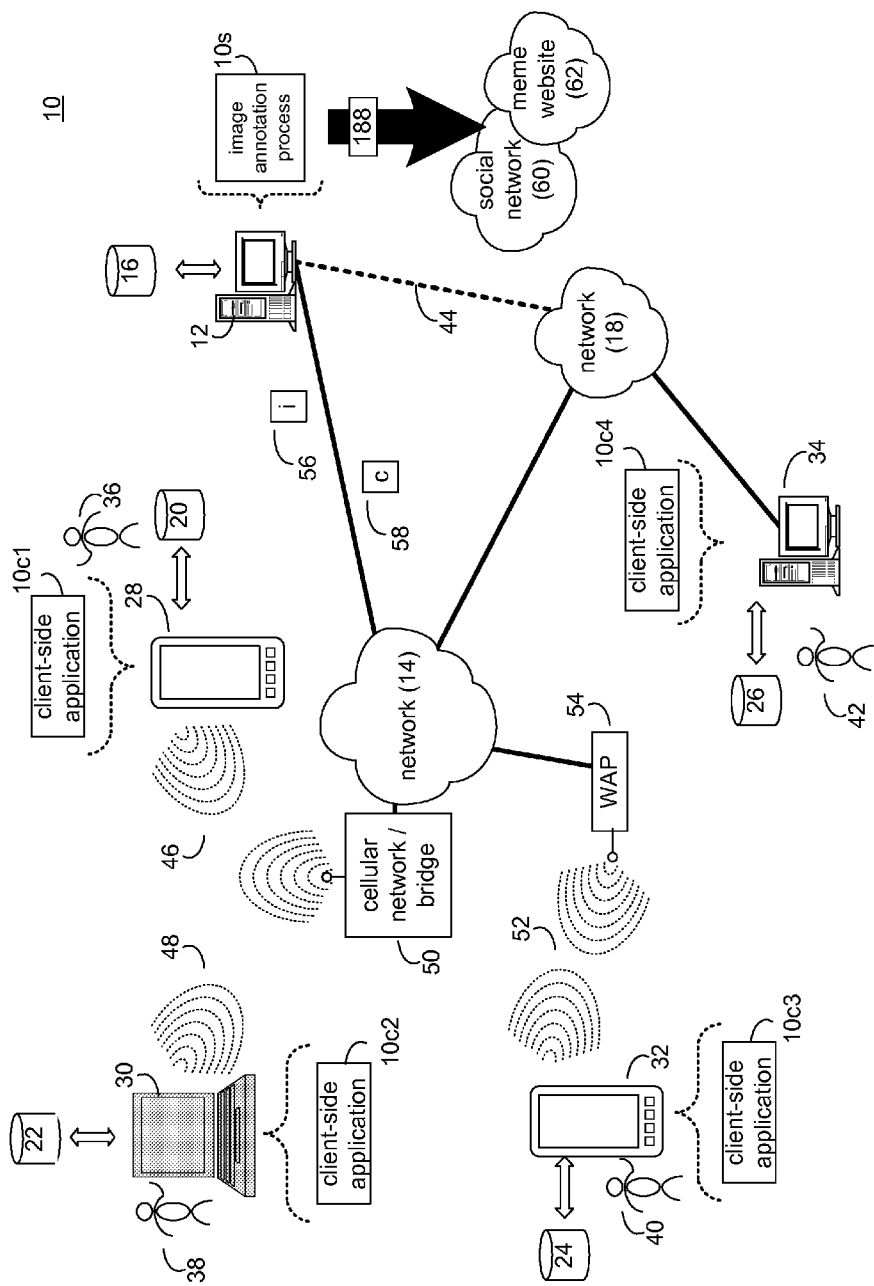
FIG. 1 is a diagrammatic view of a distributed computing network including a computing device that executes an image annotation process according to an implementation of the present disclosure.

Referring to FIG. 1, there is shown image annotation process 10. For the following discussion, it is intended to be understood that image annotation process 10 may be implemented in a variety of ways. For example, image annotation process 10 may be implemented as a server-side process, a client-side process, or a server-side/client-side process.

For example, image annotation process 10 may be implemented as a purely server-side process via image annotation process 10s. Alternatively, image annotation process 10 may be implemented as a purely client-side process via one or more of client-side application 10c1, client-side application 10c2, client-side application 10c3, and client-side application 10c4. Alternatively still, image annotation process 10 may be implemented as a server-side/client-side process via image annotation process 10s in combination with one or more of client-side application 10c1, client-side application 10c2, client-side application 10c3, and client-side application 10c4.

Accordingly, image annotation process 10 as used in this disclosure may include any combination of image annotation process 10s, client-side application 10c1, client-side application 10c2, client-side application 10c3, and client-side application 10c4.

Figure 2:
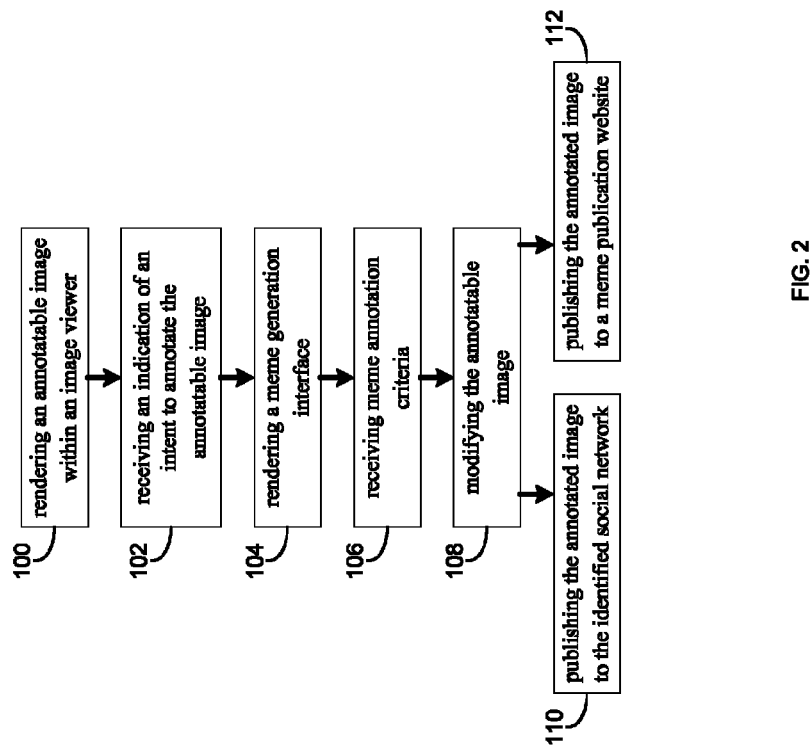
FIG. 2 is a flowchart of the image annotation process of FIG. 1 according to an implementation of the present disclosure.

Referring also to FIG. 2 and as will be discussed below in greater detail, image annotation process 10 may render 100 an annotatable image within an image viewer. An indication of an intent to annotate the annotatable image may be received 102 from a user. A meme generation interface may be rendered 104 with respect to the annotatable image. Meme annotation criteria may be received 106 from the user via the meme generation interface. The meme annotation criteria may include one or more of: a meme message, a meme position indicator, and a font type identifier. The annotatable image may be modified 108 based, at least in part, upon the meme annotation criteria, thus generating an annotated image. The annotated image may be published 110 to a meme publication website Image annotation process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of image annotation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a smartphone (not shown), a personal gaming device (not shown), a data-enabled television console (not shown), a personal music player (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access image annotation process 10 directly through network 14 or through secondary network 18. Further, image annotation process 10 may be accessed through secondary network 18 via link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. Additionally, personal computer 34 is shown directly coupled to network 18 via a hardwired network connection.

Figure 3:
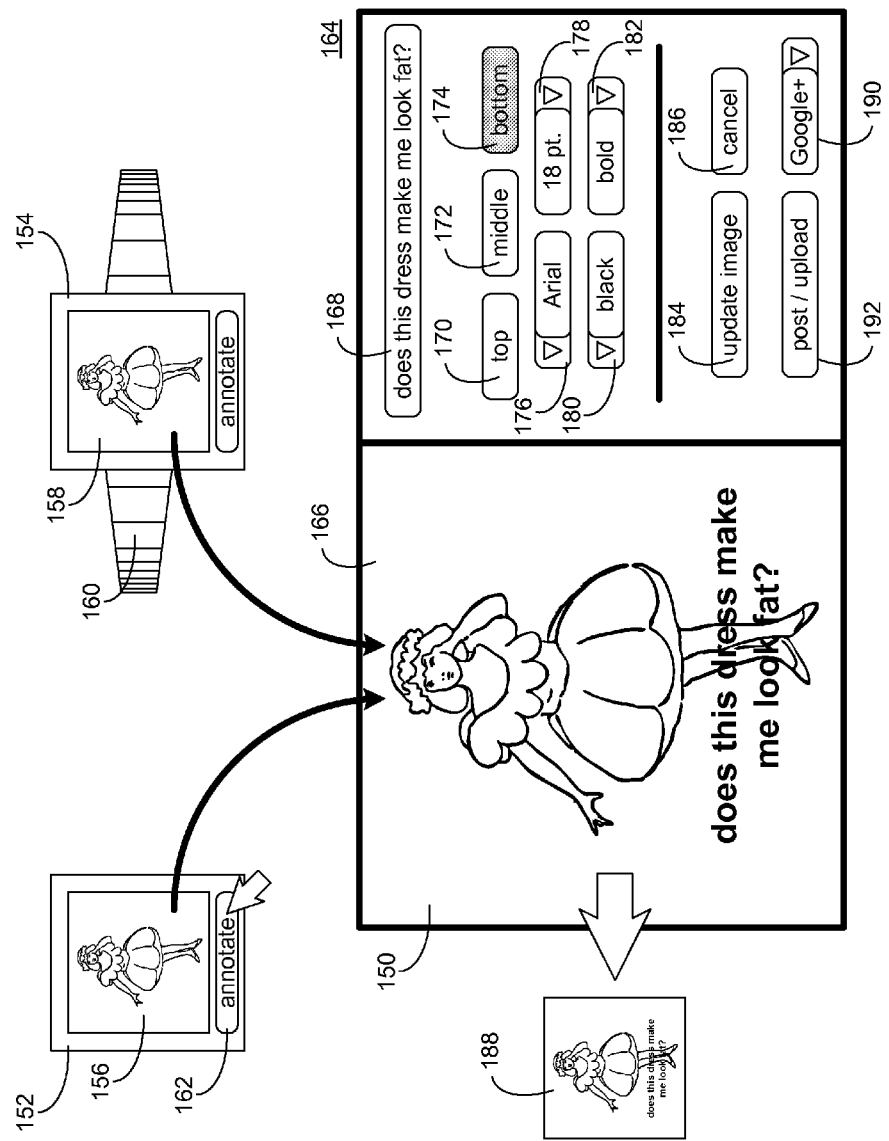
FIG. 3 is a diagrammatic view of a meme generation interface rendered by the image annotation process of FIG. 1 according to an implementation of the present disclosure.

Referring also to FIG. 3, image annotation process 10 may render 100 an annotatable image (e.g., annotatable image 150) within an image viewer (e.g., still image viewer application 152 and/or video viewer application 154). Examples of such an annotatable image may include but are not limited to still image 156 or a portion (e.g., frame 158) of video 160 (such as a Flash™ or YouTube™ video stream).

Accordingly, assume for illustrative purposes that user 38 is watching videos (e.g., video 160 via video viewer application 154) and reviewing still images (e.g., still image 156 via still image viewer application 152), which are rendered 100 on laptop computer 30 by image annotation process 10. Further, assume that upon seeing still image 156, user 38 wishes to annotate image 156. Accordingly, user 38 may select e.g., annotate button 162 (via an onscreen pointer controllable by e.g., a mouse; not shown) that is rendered within still image viewer application 152 by image annotation process 10.

While still image viewer application 152 is described above as including annotate button 162, this is for illustrative purposes only and is not intended to be a limitation of this disclosure as other configurations are possible and are considered to be within the scope of this disclosure. Further, while still image viewer application 152 is described above as being utilized by user 38 to select an image for annotation, this is for illustrative purposes only and is not intended to be a limitation of this disclosure as other configurations are possible and are considered to be within the scope of this disclosure. For example and as described above, a portion (e.g., frame 158) of video 160 (such as a Flash™ or YouTube™ video stream) may be selected for annotation.

Upon selecting annotate button 162, indication 56 (i.e., an indication of an intent to annotate annotatable image 150 from e.g., user 38) may be provided from e.g., laptop computer 30 to image annotation process 10. Upon image annotation process 10 receiving 102 indication 56, image annotation process 10 may render 104 meme generation interface 164 with respect to annotatable image 150. Accordingly, meme generation interface 164 may include image viewing field 166, meme message field 168, meme position indicator buttons 170, 172, 174, meme font selector field 176, meme font size field 178, meme font color field 180, and meme font type field 182.

Accordingly and through the use of meme generation interface 164, user 30 may enter a meme message for inclusion within an attainable image 150. For example, user 30 may enter the meme message "does this dress make me look fat?" into meme message field 168. Further, through the use of meme position indicator buttons 170, 172, 174, user 30 may select the location of the new message within annotatable image 150 as "top" via button 170, "middle" via button 172, and "bottom" via button 174. Additionally, through the use of meme font selector field 176, meme font size field 178, meme font color field 180, and meme font type field 182, user 30 may select the font (e.g., Time New Roman, Arial), font size (e.g., 12 point, 14 point), font color (e.g., black, red), and font type (e.g., italics, bold, underlined). Once properly annotated, user 30 may select "update image" button 184 using the on-screen pointer. Alternatively, user 30 may select "cancel" button 186 if they do not wish to make any changes to annotatable image 150.

Upon selecting "update image" button 184, meme annotation criteria 58 may be provided from e.g. laptop computer 30 to image annotation process 10. Meme annotation criteria 58 may include one or more of: a meme message (e.g., "does this dress make me look fat?"), a meme position indicator (e.g., bottom), a font type identifier (e.g., Arial), a font size (e.g., 14 point), a font color (e.g., black), and a font type (e.g., bold).

Upon image annotation process 10 receiving 106 meme annotation criteria 58 from user 38 via meme generation interface 164, image annotation process 10 may modify 108 annotatable image 150 based, at least in part, upon meme annotation criteria 58, thus generating annotated image 188.

Meme generation interface 164 may be configured to allow user 38 to identify a social network (e.g., social network 60) for publishing 110 annotated image 188. For example, user 38 may select the desired social network (e.g., Google+™, Facebook™, Twitter™) via dropdown menu 190 and, once the appropriate social network is selected, user 38 may select (via the on-screen pointer) "post/upload" button 192 to effectuate the publishing 110 of annotated image 188 to the selected social network. Upon selecting "post/upload" button 192, user 38 may be prompted to provide username and password information for the selected social network.

Additionally, meme generation interface 164 may be configured to allow user 38 to identify a meme publication website (e.g., meme website 62) for publishing 112 annotated image 188. For example, user 38 may select the desired meme publication website (e.g., Memestache™, KnowYourMeme™) via dropdown menu 190 and, once the appropriate meme publication website is selected, user 38 may select (via the on-screen pointer) "post/upload" button 192 to effectuate the publishing 112 of annotated image 188 to the selected meme publication website. Upon selecting "post/upload" button 192, user 38 may be prompted to provide username and password information for the selected meme publication website.

As discussed above, upon selecting "update image" button 184, meme annotation criteria 58 may be provided from e.g. laptop computer 30 to image annotation process 10. Upon image annotation process 10 receiving 106 meme annotation criteria 58 from user 38 via meme generation interface 164, image annotation process 10 may modify 108 annotatable image 150 based, at least in part, upon meme annotation criteria 58, thus generating annotated image 188. Image annotation process 10 may be configured so that modifying 108 annotatable image 150 may occur at a later time/date. For example, image annotation process 10 may be configured so that meme annotation criteria 58 is stored for processing (and subsequent image annotation) at a later date, thus allowing for e.g., the offline generation of meme annotation criteria 58 which may subsequently be processed when e.g., laptop computer 30 is subsequently online.

Figure 4:
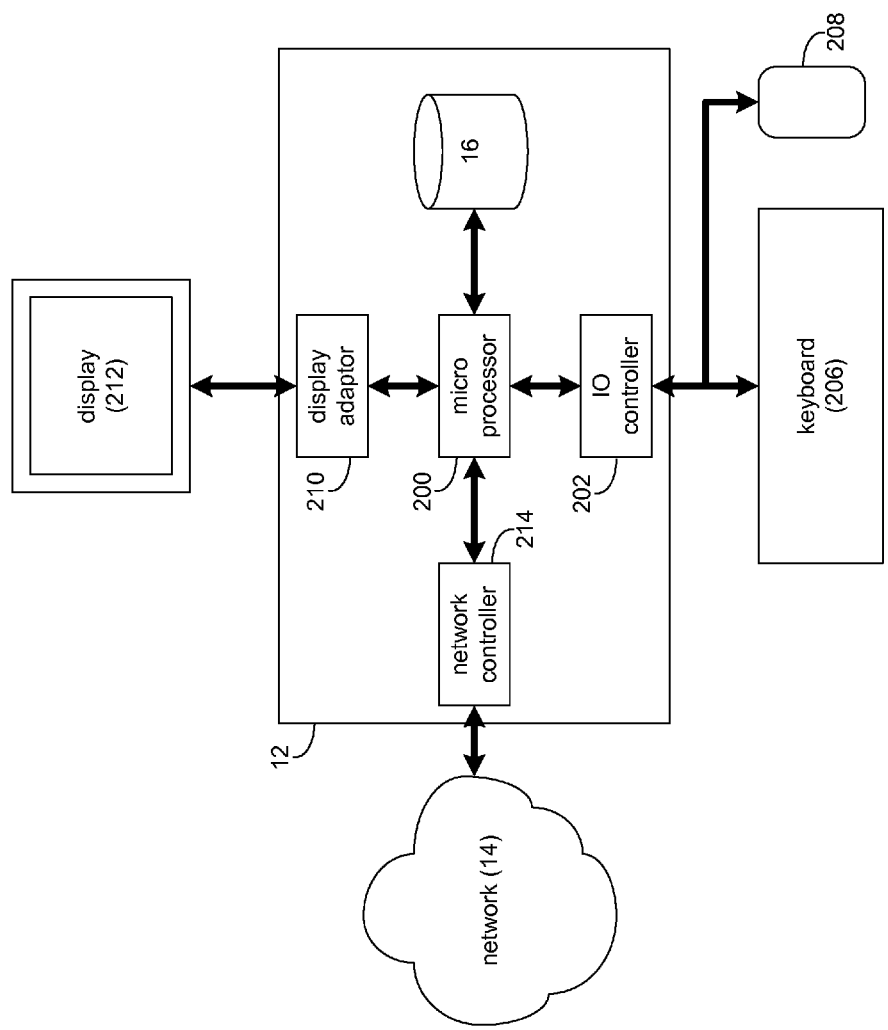
FIG. 4 is a diagrammatic view of the computing device of FIG. 1 according to an implementation of the present disclosure.

Referring also to FIG. 4, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, image annotation process 10 may be substituted for computing device 12 within FIG. 3, examples of which may include but are not limited to client electronic devices 28, 30, 32, 34.

Computing system 12 may include microprocessor 200 configured to e.g., process data and execute instructions/code for image annotation process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 206, mouse 208, USB ports (not shown), and printer ports (not shown). Display adaptor 210 may be configured to couple display 212 (e.g., a CRT or LCD monitor) with microprocessor 200, while network adapter 214 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 350) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    causing a video to be presented on a user device in a video viewer that includes a selectable input for indicating that a video frame of the video is to be converted to a meme image;
    receiving, from the user device, a selection of a video frame of the video;
    rendering the video frame as an annotatable image within an image viewer that is separate from the video viewer;
    receiving an indication of an intent to annotate the annotatable image from a user via the selectable input of the video viewer;
    in response to receiving the indication of the intent to annotate the annotatable image via the selectable input of the video viewer, rendering a meme generation interface with respect to the annotatable image, wherein the meme generation interface includes a text box for receiving a meme message, a first plurality of selectable inputs for indicating a meme position indicator for the meme message within the meme image, and a second plurality of selectable inputs for indicating a font type and a font size, and wherein each of the first plurality of selectable inputs indicates one meme position from a plurality of meme positions that include a top position for the meme message within the meme image, a middle position for the meme message within the meme image, and a bottom position for the meme message within the meme image;

receiving meme annotation criteria from the user via the meme generation interface, wherein the meme annotation criteria includes the meme message, the meme position indicator, the font type, and the font size;

in response to receiving the meme annotation criteria, modifying the annotatable image based, at least in part, upon the meme annotation criteria, thus generating the meme image with the meme message having a font of the font type and of the font size, wherein selection of the top position selectable input causes the meme message to be positioned in a top portion of the meme image, selection of the middle position selectable input causes the meme message to be positioned in a middle portion of the meme image, and selection of the bottom position selectable input causes the meme message to be positioned in a bottom portion of the meme image;

receiving a first username and a first password corresponding to a meme publication web site;

receiving a second username and a second password corresponding to a social networking site;

publishing the annotated image to the meme publication website using the received first username and first password; and publishing the annotated image to the social networking site using the received second username and second password.

2. A computer-implemented method comprising:

causing a video to be presented on a user device in a video viewer that includes a selectable input for indicating that a video frame of the video is to be converted to a meme image;

receiving, from the user device, a selection of a video frame of the video;

rendering the video frame as an annotatable image within an image viewer that is separate from the video viewer;

receiving an indication of an intent to annotate the annotatable image from a user via the selectable input of the video viewer;

in response to receiving the indication of the intent to annotate the annotatable image via the selectable input of the video viewer, rendering a meme generation interface with respect to the annotatable image, wherein the meme generation interface includes a text box for receiving a meme message, a first plurality of selectable inputs for indicating a meme position indicator for the meme message within the meme image, and a second plurality of selectable inputs for indicating a font type and a font size, and wherein each of the first plurality of selectable inputs indicates one meme position from a plurality of meme positions that include a top position for the meme message within the meme image, a middle position for the meme message within the meme image, and a bottom position for the meme message within the meme image;

receiving meme annotation criteria from the user via the meme generation interface;

in response to receiving the meme annotation criteria, modifying the annotatable image based, at least in part, upon the meme annotation criteria, thus generating the meme image with the meme message having a font of the font type and of the font size, wherein selection of the top position selectable input causes the meme message to be positioned in a top portion of the meme image, selection of the middle position selectable input causes the meme message to be positioned in a middle portion of the meme image, and selection of the bottom position selectable input causes the meme message to be positioned in a bottom portion of the meme image;

receiving a first username and a first password corresponding to a meme publication web site;

receiving a second username and a second password corresponding to a social networking site;

publishing the annotated image to the meme publication website using the received first username and first password; and publishing the annotated image to the social networking site using the received second username and second password.

3. The computer-implemented method of claim 2 wherein the video is a flash video stream.

4. The computer-implemented method of claim 2 wherein the image viewer is a still image viewer application.

5. The computer-implemented method of claim 2 wherein the image viewer is a video viewer application.

6. The computer-implemented method of claim 2 wherein the meme generation interface is configured to allow the user to identify a social network for publishing the annotated image.

7. The computer-implemented method of claim 2 wherein modifying the annotatable image includes modifying the annotatable image at a later time/date.

8. A computing system including a processor and memory configured to perform operations comprising:

causing a video to be presented on a user device in a video viewer that includes a selectable input for indicating that a video frame of the video is to be converted to a meme image;

receiving, from the user device, a selection of a video frame of the video;

rendering the video frame as an annotatable image within an image viewer that is separate from the video viewer;

receiving an indication of an intent to annotate the annotatable image from a user via the selectable input of the video viewer;

in response to receiving the indication of the intent to annotate the annotatable image via the selectable input of the video viewer, rendering a meme generation interface with respect to the annotatable image, wherein the meme generation interface includes a text box for receiving a meme message, a first plurality of selectable inputs for indicating a meme position indicator for the meme message within the meme image, and a second plurality of selectable inputs for indicating a font type and a font size, and wherein each of the first plurality of selectable inputs indicates one meme position from a plurality of meme positions that include a top position for the meme message within the meme image, a middle position for the meme message within the meme image, and a bottom position for the meme message within the meme image;

receiving meme annotation criteria from the user via the meme generation interface;

in response to receiving the meme annotation criteria, modifying the annotatable image based, at least in part, upon the meme annotation criteria, thus generating the meme image with the meme message having a font of the font type and of the font size, wherein selection of the top position selectable input causes the meme message to be positioned in a top portion of the meme image, selection of the middle position selectable input causes the meme message to be positioned in a middle portion of the meme image, and selection of the bottom position selectable input causes the meme message to be positioned in a bottom portion of the meme image;

receiving a first username and a first password corresponding to a meme publication web site;

receiving a second username and a second password corresponding to a social networking site;

publishing the annotated image to the meme publication website using the received first username and first password; and publishing the annotated image to the social networking site using the received second username and second password.

9. The computing system of claim 8 wherein the video is a flash video stream.

10. The computing system of claim 8 wherein the image viewer is a still image viewer application.

11. The computing system of claim 8 wherein the image viewer is a video viewer application.

12. The computing system of claim 8 wherein the meme generation interface is configured to allow the user to identify a social network for publishing the annotated image.

13. The computing system of claim 8 wherein modifying the annotatable image includes modifying the annotatable image at a later time/date.

\* \* \* \* \*